(12) United States Patent
Hatanaka

(10) Patent No.: US 7,853,115 B2
(45) Date of Patent: Dec. 14, 2010

(54) FILE MANAGEMENT SYSTEM OF IMAGE DATA

(75) Inventor: Koji Hatanaka, Kanagawa-ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 1750 days.

(21) Appl. No.: 10/216,172

(22) Filed: Aug. 12, 2002

(65) Prior Publication Data

US 2002/0186960 A1     Dec. 12, 2002

Related U.S. Application Data

(62) Division of application No. 08/949,531, filed on Oct. 14, 1997, now Pat. No. 6,438,320.

(30) Foreign Application Priority Data

Oct. 16, 1996     (JP) ................................. 8-273494

(51) Int. Cl.
*H04N 5/76*     (2006.01)
*H04N 7/00*     (2006.01)

(52) U.S. Cl. ........................................ 386/46; 386/125

(58) Field of Classification Search .................... 386/1, 386/45–46, 125–126
See application file for complete search history.

(56) References Cited

U.S. PATENT DOCUMENTS

| | | | | |
|---|---|---|---|---|
| 5,481,303 A | | 1/1996 | Uehara | ........................ 348/231 |
| 5,555,098 A | * | 9/1996 | Parulski | ........................ 386/104 |
| 5,806,072 A | * | 9/1998 | Kuba et al. | .................... 707/200 |
| 5,899,581 A | | 5/1999 | Kawamura et al. | .......... 348/231 |

(Continued)

FOREIGN PATENT DOCUMENTS

EP     594 992     5/1994

(Continued)

OTHER PUBLICATIONS

Communication from European Patent Office dated Oct. 19, 2007 in corresponding European Application No. 97 117 880.1.

*Primary Examiner*—Thai Tran
*Assistant Examiner*—Nigar Chowdhury
(74) *Attorney, Agent, or Firm*—Fitzpatrick, Cella, Harper & Scinto

(57) ABSTRACT

In a system for file managing image data of an electronic camera, so long as the image data is recorded by the same image pickup apparatus, a peculiar file name which is not overlapped is generated and in order to prevent that a plurality of files of the same name exist, when an electronic camera is connected to a main body of a computer, a storage device in the electronic camera is examined from a host application of the computer, and when a file of a file name including numerical values exceeding a predetermined value is found, a message is displayed for the user in a manner such that after all of the files having the file names which had automatically been formed were transferred to the computer, all of the contents in the storage device are deleted or formatted. When the detachable storage device is loaded or a power source is turned on, if the file having the unique file name which was automatically generated does not exist in the storage device, the numerical values held in the electronic camera are initialized.

8 Claims, 10 Drawing Sheets

U.S. PATENT DOCUMENTS

| | | | |
|---|---|---|---|
| 5,914,787 A | 6/1999 | Satoh et al. | 348/231 |
| 5,966,495 A | 10/1999 | Takahashi et al. | 386/95 |
| 5,982,981 A | 11/1999 | Satoh | 386/117 |
| 5,986,773 A | 11/1999 | Goto et al. | 348/231 |
| 6,005,679 A | 12/1999 | Haneda | 348/231 |
| 6,040,873 A | 3/2000 | Izumi et al. | 348/231 |
| 6,072,936 A | 6/2000 | Koyama | 386/95 |
| 6,111,662 A | 8/2000 | Satoh et al. | 358/442 |

FOREIGN PATENT DOCUMENTS

| | | |
|---|---|---|
| JP | 6-217175 | 8/1994 |
| JP | 6-231023 | 8/1994 |
| JP | 6-350950 | 1/1996 |
| JP | 8-65403 | 3/1996 |
| WO | WO 9222983 A2 * | 12/1992 |

* cited by examiner

FILE MANAGEMENT SYSTEM OF IMAGE DATA

This application is a division of application Ser. No. 08/949,531, filed Oct. 14, 1997.

BACKGROUND OF THE INVENTION

1. Field of the Invention

In an image pickup apparatus such as an electronic camera or the like, the invention relates to a file management system of an image pickup apparatus such that in case of storing recording image data as a file into a storage device, even if a storage medium is exchanged, so long as the data is recorded by the same image pickup apparatus, a peculiar file name is automatically formed for a recording image.

2. Related Background Art

Hitherto, in case of recording an image onto a recording medium by an electronic camera, although it is necessary to allocate a name to a file of the image, a method whereby a number to be updated every photographing operation is included in the file name has been proposed. In such an apparatus, however, when the recording medium is exchanged, the number included in the file name of the image is reset. Therefore, there is a case where a plurality of files of the same name exist.

Since a conventional file management system of image data is constructed as mentioned above, there are the following problems.

That is, in the case where the file name is formed as mentioned above, when it is intended to transfer data from the storage device of the electronic camera to a computer, there is a possibility such that files of the same name also exist in an auxiliary storage device of the computer. In such a case, the user has to take a procedure such that the file existing in the auxiliary storage device of the computer is overwritten or, since the same file name exists, a message to instruct to change the file name is displayed, or the like.

Although the number of file names which can be formed is determined by the number of digits of numerical values which are included in the file name, in case of forming a file while sequentially including a series of numerical values, for example, starting from 0 among numerical values of five digits into the file name, the number of numerical values which can be used is equal to 100000 within a range from "00000" to "99999". Therefore, file names exceeding 100000 cannot be formed. In order to avoid such a limitation, for example, there is a method of returning the numerical values included in the file name to the original numerical values in a manner such that, for instance, the file name which is formed subsequently to "IMG99999. JPG" is set to "IMG00000. JPG". In this case, however, if the file of "IMG00000. JPG" still exists in the storage device, the file which has originally existed will be overwritten.

Since numerical values to be included in the file name are determined by examining the file names of the files existing in the recording medium to record data, in the case where the recording medium is exchangeable, the file of the same file name is formed on a plurality of recording media.

SUMMARY OF THE INVENTION

It is an object of the invention to solve the problems as mentioned above.

Another object of the invention is to provide a file management system of image data, in which a peculiar file name which is not overlapped can be allocated so long as it is recorded by the same image pickup apparatus, thereby making it possible to prevent a situation that a plurality of files of the same name exist.

A file management system of image data according to one aspect of the invention is constructed as follows.

(1) A file management system for managing photographed image data as files comprises a counter for updating a numerical value every image recording and generating means for generating a file name on the basis of the numerical value of the counter, wherein when the recording image data is stored as a file, even in case of recording all of the image data photographed by a same image pickup apparatus onto different recording media, an individual file name which is not overlapped is formed when they are recorded by the same image pickup apparatus.

(2) In the above system of (1), when the numerical value of the counter lies within a preset range, a warning and a predetermined method of taking a countermeasure are displayed.

(3) In the system of (2), the numerical values are sequentially included in the file name in accordance with the order from the smaller numerical value, the numerical values included or the numerical value to be next included are stored into the counter, and a preset range is set equal to or more than a predetermined value based on the stored numerical value.

(4) In the system of (2), the numerical values are sequentially included in the file name in accordance with the order from the larger numerical value, the numerical values included or the numerical value to be next included are stored into the counter, and the preset range is set equal to or less than a predetermined value based on the stored numerical value.

(5) In the system of (2), when the numerical value of the counter lies within the preset range and the file formed before does not exist in a storage device in which the file is formed, the numerical value of the counter is initialized.

(6) In any one of the systems of (2) to (4), the predetermined method of taking a countermeasure is to delete the file to which the file name was allocated among the files included in the storage device serving as a target.

(7) In any one of the systems of (2) to (4), the predetermined method of taking a countermeasure is to format the storage device serving as a target.

The above and other objects and features of the present invention will become apparent from the following detailed description and the appended claims with reference to the accompanying drawings.

DESCRIPTION OF THE PREFERRED EMBODIMENT

Figure 1:
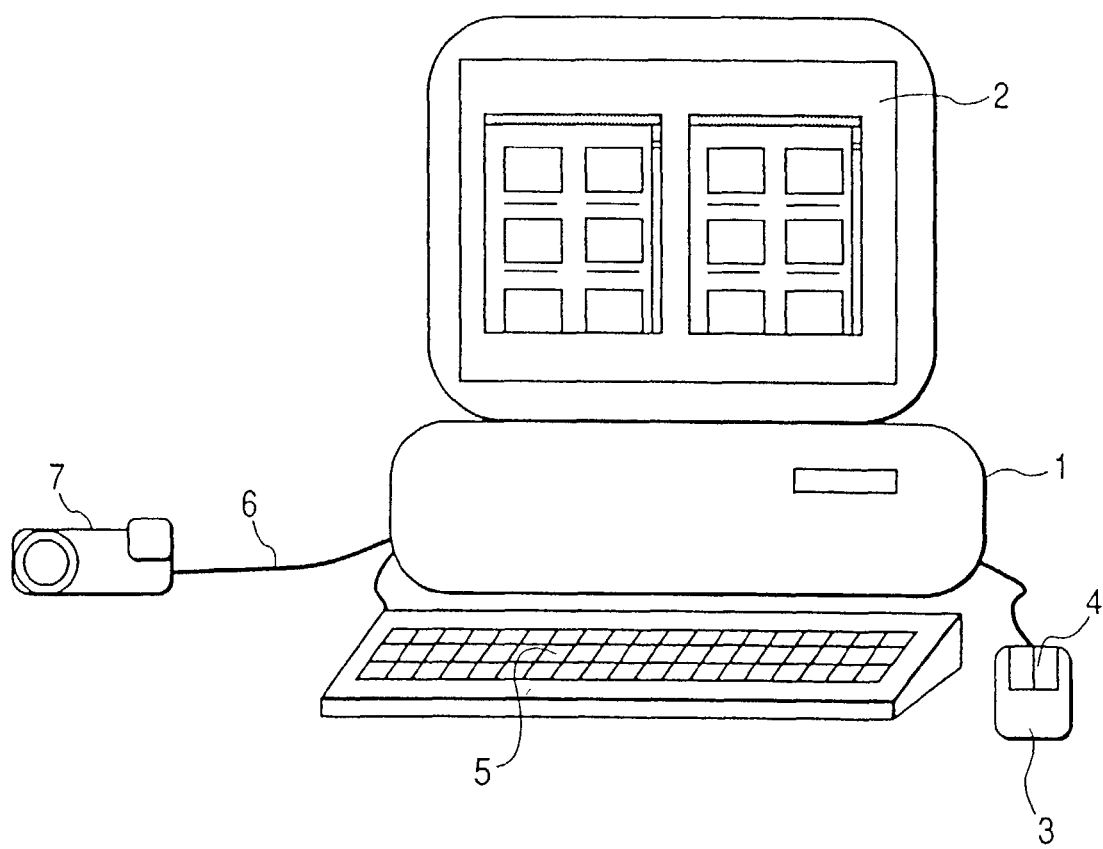
FIG. 1 is an explanatory diagram showing an equipment construction of an embodiment.

FIG. 1 is a diagram showing an equipment construction of an embodiment of the invention and shows a constructional example of a personal computer system including an electronic camera (image pickup apparatus) as a platform.

In FIG. 1, reference numeral 1 denotes a main body of a computer; 2 a display for displaying data; 3 a mouse serving as a typical pointing device; 4 a mouse button; 5 a keyboard for inputting and outputting; and 6 an interface for connecting an electronic camera 7 to the computer. A general interface such as bidirectional parallel interface, SCSI interface, or the like which can transmit an image at a high speed is used as an interface 6.

Figure 2:
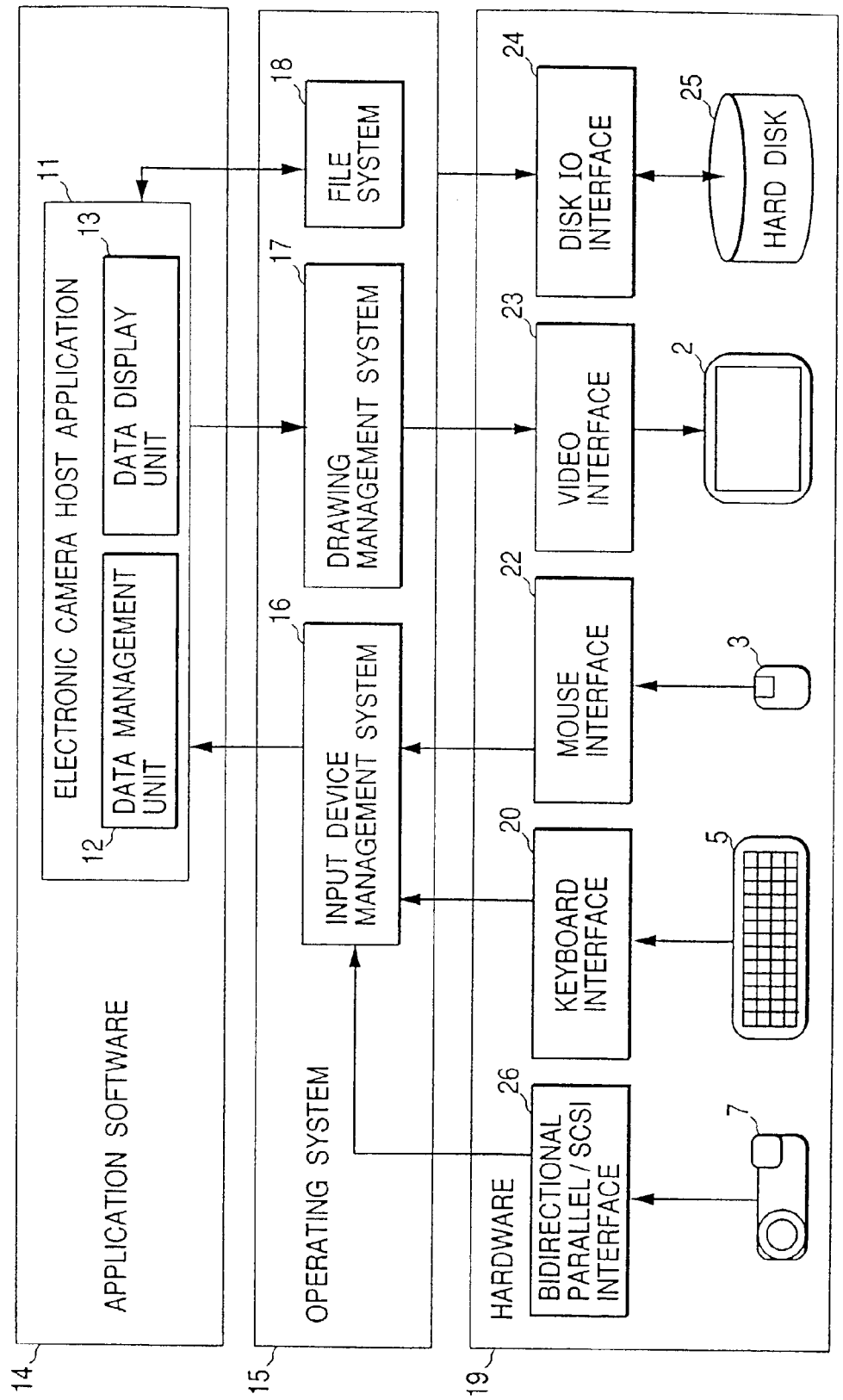
FIG. 2 is a block diagram showing a system construction of the embodiment.

FIG. 2 is a block diagram showing a construction of a file management system including software and hardware according to the embodiment. In the diagram, reference numeral 19 denotes hardware; 15 an operating system (hereinafter, abbreviated to "OS") which operates on the hardware 19; and 14 application software which operates on the OS 15.

Blocks which are not directly necessary when explaining the embodiment although they are obviously included as component requirements among the blocks constructing the hardware 19 and OS 15 are not shown. As examples of the blocks which are not shown, there are a CPU and a memory as hardware and a memory management system and the like as OSs.

In FIG. 2, reference numeral 25 denotes a hard disk to physically store a file or data, and 18 indicates a file system constructing the OS 15 and having a function for enabling the application software 14 to input and output the file without being aware of the hardware 19.

Reference numeral 24 denotes a disk IO interface for allowing the file system 18 to perform the reading and writing operations of the hard disk 25, and 17 indicates a drawing management system constructing the OS 15 and having a function for enabling the application software 14 to draw without being aware of the hardware 19.

Reference numeral 23 denotes a video interface for allowing the drawing management system 17 to draw onto a display, and 16 indicates an input device management system constructing the OS 15 and having a function for enabling the application software 14 to receive an input of the user without being aware of the hardware 19.

Reference numeral 20 denotes a keyboard interface for allowing the input device management system 16 to receive an input of the keyboard 5, and 22 indicates a mouse interface for enabling the input device management system 16 to receive an input from the mouse 3.

The electronic camera 7 is connected to a bidirectional interface 26, an SCSI interface, or the like and can transmit and receive image data or the like through the input device management system 16.

Reference numeral 11 denotes an electronic camera host application; 12 a data management unit for managing the image data by attribute information or by a keyword or the like which is inputted by the user; and 13 a data display unit for displaying the managed image data.

In the system, the image data from the electronic camera 7 is transferred to a computer or the transferred image data is registered into the image data management system 11 by the electronic camera host application 11.

Figure 3:
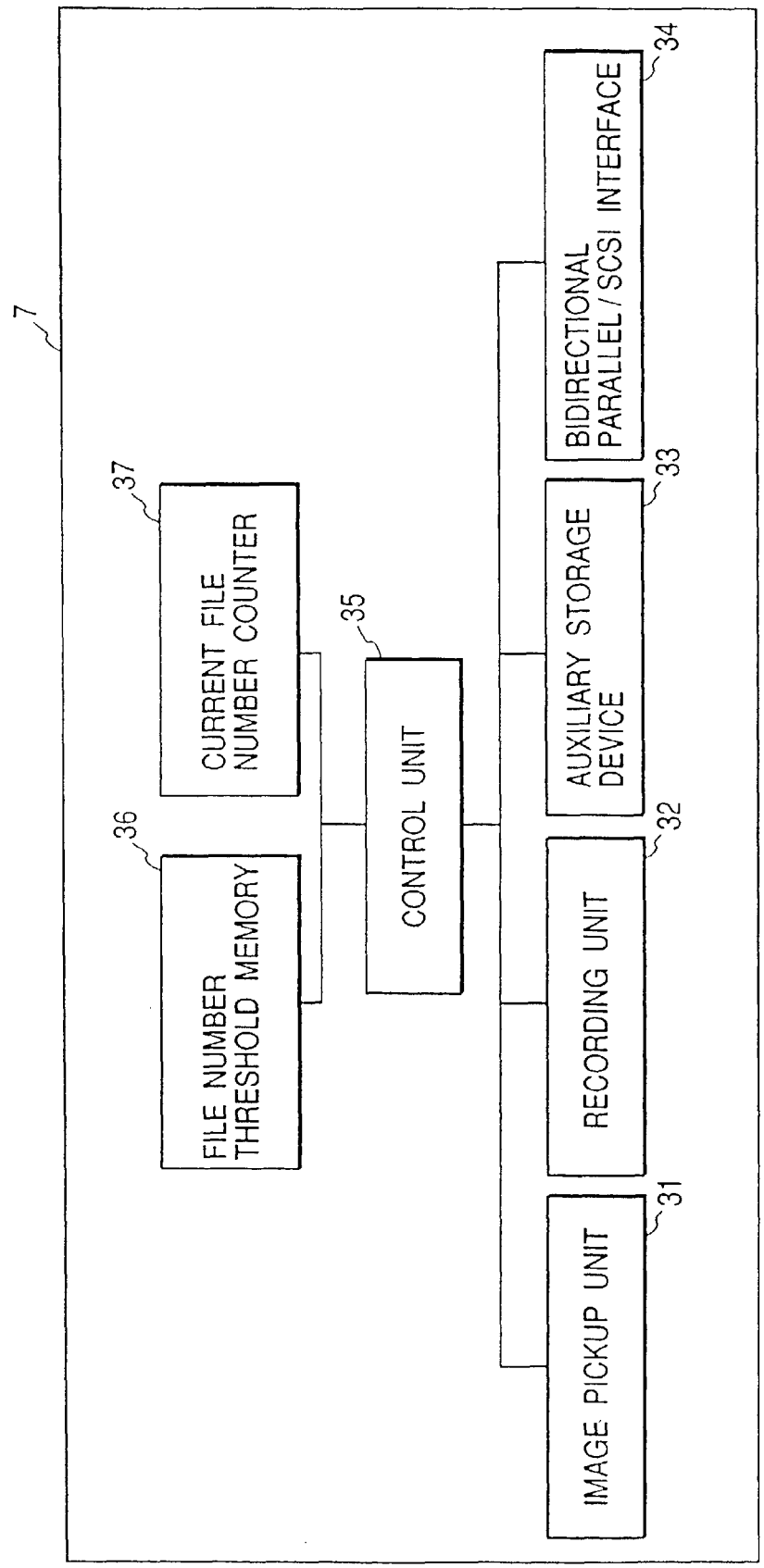
FIG. 3 is a block diagram showing a system construction of an electronic camera in the embodiment.

FIG. 3 is a block diagram showing a system construction of the electronic camera 7. Blocks which are not directly necessary when explaining the embodiment although they are obviously included in the component requirements are not shown.

In FIG. 3, an image pickup unit 31 includes a lens and a CCD and generates a photographed image as image data (JPG data). The image pickup unit 31 also simultaneously forms thumbnail image data as a reduction image of the photographed image.

In the electronic camera 7 in the system, not only the image is photographed but also an audio sound can be recorded and is outputted as recording data (WAVE data) by a recording unit 32. An auxiliary storage device 33 is used to store data from the image pickup unit 31 and recording unit 32 as a file. In this system, a memory card corresponding to PCMCIA as a detachable recording medium is used as an auxiliary storage device 33.

Reference numeral 34 denotes an interface when connecting the electronic camera 7 and the computer. The interface 34 is connected to the bidirectional parallel/SCSI interface 26 in FIG. 2. A general interface such as bidirectional parallel interface, SCSI interface, or the like is used as an interface 34 in a manner similar to the interface 26.

Reference numeral 35 denotes a control unit constructing file name forming means. The control unit 35 controls the operation of the whole electronic camera. Reference numeral 36 denotes a file number threshold memory for holding the maximum value of the normal values among the numerical values included in the file. In this system, when numerical values exceeding this numerical value are included in the file name, some exception process is executed, thereby preventing the overlapped file name from being formed after the numerical values were circulated once.

Reference numeral 37 denotes a current file number counter serving as a nonvolatile memory to hold the numerical values included in the file name that is subsequently formed. An initial value (which is set at the time of shipping of the electronic camera 7 from a factory) of the current file number is equal to 1. Therefore, even if the on/off operation of a power source of the electronic camera 7, an exchange of the memory card, or the like is executed, the file name which is generated bygone electronic camera 7 in a lifetime is fundamentally unique and peculiar name which is not overlapped.

A rule of naming a file name and a directory name in the system will now be described.

In the system of the embodiment, in order to automatically form the unique file name, numerical values of five digits are included in a part of the file name. In this instance, it is assumed that the numerical values to be included are fundamentally sequentially increased from 1 each time the file is formed. When the numerical values which are formed are equal to or larger than the values stored in the file number threshold memory 36, the exception process is executed.

In the embodiment, the numerical values of 99900 have been stored in the file number threshold memory 36. The numerical values of 99900 are numerical values for providing an allowance of up to 99999 as a maximum value of decimal number of five digits and are not limited to them. For example, there is no problem in case of 99000. By setting the file number threshold value with a certain allowance, even if the file name including the numerical values exceeding this threshold value is formed, a situation that an inconvenience immediately occur can be avoided.

The files are classified into subdirectories every predetermined number of files in accordance with the numerical values included in the file name. The file name of the subdirectory is also automatically formed and stored into the storage device.

In the system, the subdirectory to store the files formed by the electronic camera 7 starts from "CTG" like "CTG10100" and subsequently has a file name of eight characters comprising decimal number of five digits. Explanation will now be made on the assumption that the decimal number of five digits is set to the directory number and the directory for storage is set to a CTG directory.

The CTG directory is arranged under a "DC" subdirectory under the route directory in the auxiliary storage device 33.

A name of the file of image and audio data which is formed by the electronic camera 7 is constructed by a file name of eight characters and an extension of three characters. In the system, alphanumerical characters of three characters from the head of the file name to store the image data are fixedly set to "AUT". Similarly, head three characters of the file name of the thumbnail image are fixedly set to "THM" and three characters from the head of the file name of the audio data are fixedly set to "SND".

For example, in case of the image data, the file name is "AUT10100. JPG". In case of the thumbnail data, the file name is "THM10100. JPG". In case of the audio data, the file name is "SND10100. WAV". As mentioned above, each file name is expressed by three characters, the decimal number of five digits, and the extension of three characters. In the following description, the decimal number of five digits is set to the file number.

In this system, the image files or audio files having the same file number are treated as a group of data and are set to an object. That is, the file names of the same file number are included in one object. For example, the file name of the thumbnail image data for the image data of the file name "AUT10100. JPG" is "THM10100. JPG". When there is audio data, its file name is "SND10100. WAV". Those three files construct one object. In the system of the embodiment, each time one object is formed, the value of the current file number counter 37 is increased by 1.

In the system, in order to handle the object as one data unit, in case of deleting data, it is performed on an object unit basis. In case of deleting the object from the camera 7 or the host application of the computer, if there is an attribute of protect (or ReadOnly) even in one of the files included in the object, such an object cannot be deleted.

In the system, the number (kNumObjInDir) of objects included in one CTG directory has been predetermined. Further, a directory number (dirNo) of the CTG directory in which the object in which the file having a certain file number (fileNo) is included exists is determined by an equation (A) in FIG. 8. FIG. 9 shows a constructional example of directories and files formed by the camera 7 in accordance with this rule.

A forming method of the file name and a deciding method and a forming method of the CTG directory to store the file name in the system of the embodiment will now be described.

In the system, MS-DOS of Microsoft Co., Ltd. is used as a disk operating system to manage the file structure of the memory card serving as a storage device of the electronic camera 7.

Figure 4A:
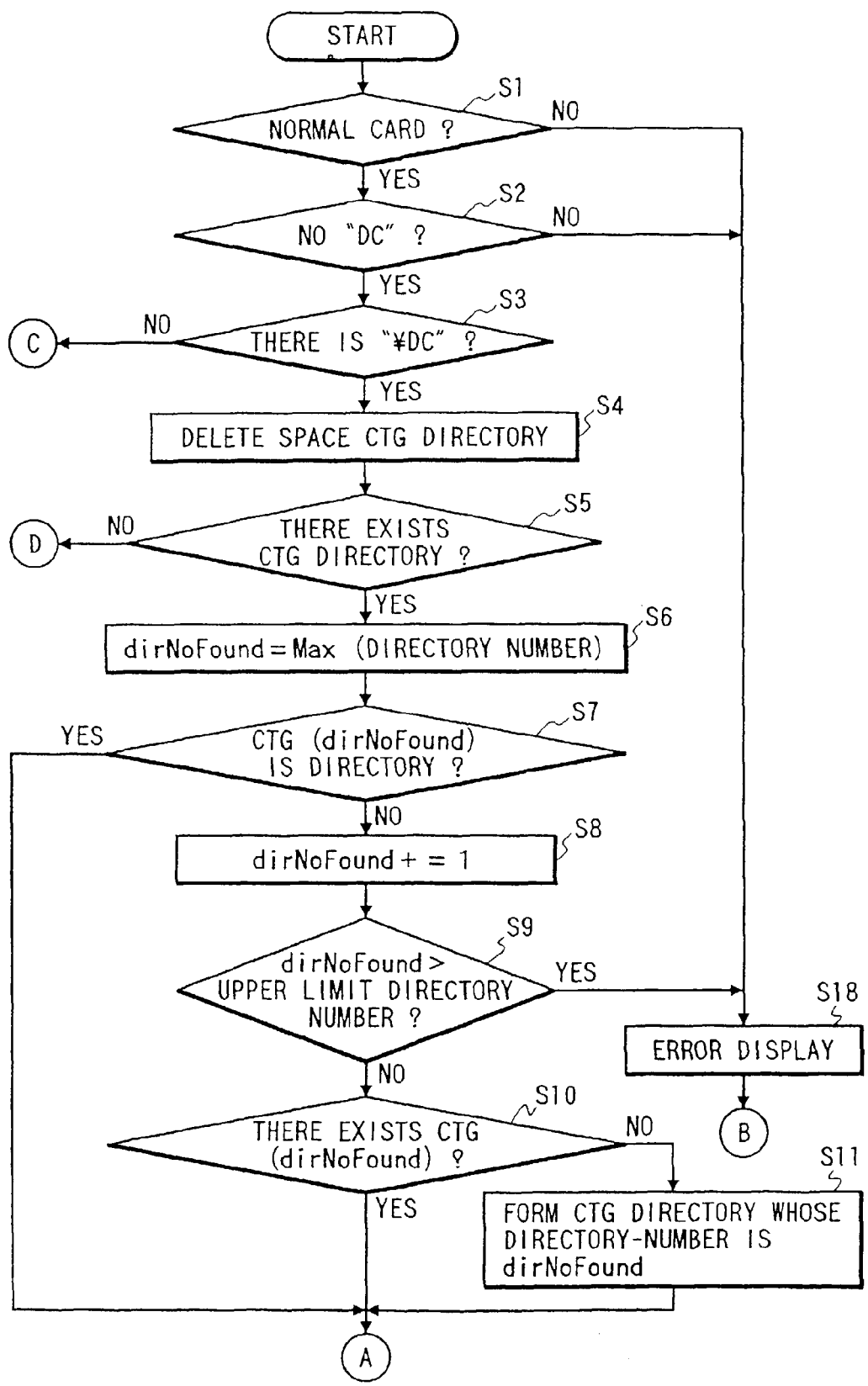
FIGS. 4A, 4B, 4C and 4D are flowcharts showing the operation when a memory card is inserted into the electronic camera.

Processes which are executed when the memory card serving as a storage medium is inserted into the electronic camera 7 or when the power source of the electronic camera 7 is turned on will now be described with reference to flowcharts of FIGS. 4A and 4B.

First, a check is made in step S1 to see if the card inserted into the electronic card 7 is normal. If it is not normal, in order to notify the user of such a fact, a warning message is displayed in step S18 and the processing routine is finished. The card which is not normal indicates a card such that the electronic camera 7 cannot read the contents of the card or the like. In case of the normal card, step S2 follows.

In step S2, the file structure in the memory area of the card is examined and a check is made to see if the file of the file name "DC" exists in the route directory. If the file of such a file name exists, since the directory of the same name cannot be formed, step S18 follows and a message to notify the user of the reason is displayed on a display apparatus and the processes are finished. When the file of the name "DC" does not exist in the route directory, step S3 follows.

In step S3, a check is made to see if the directory of the name "DC" exists in the route directory. In the system, data such as image data or audio data which is generated by the electronic camera is stored in the directory of the name "DC" as a subdirectory of the route directory. Such a directory is called a DC directory in the following description.

When the DC directory does not exist, step S17 follows and a DC directory is formed. After that, the processing routine advances to step S19. When the DC directory exists, step S4 follows.

In step S4, the contents in the DC directory are examined. When a space CTG directory exists, it is deleted. The space CTG directory denotes a directory in which none of the file and directory exists therein.

In step S5, a check is made to see if the CTG directory exists in the DC directory. If it does not exist, step S19 follows.

Step S19 relates to a process which is executed when the CTG directory does not exist as a subdirectory of the DC directory. That is, it is a process which is executed in the case where the card just after it was formatted by the camera 7 or the host application or the camera which was all erased (Erase All) is inserted into the electronic camera 7.

The current file number which is stored into the current file number counter 37 of the electronic camera 7 is compared with the file number threshold value recorded in the file number threshold memory 36. When the current file number exceeds the file number threshold value, a process in step S20 is executed in order to perform an exception process (1), which will be explained hereinlater. After that, the processing routine advances to step S21 and the CTG directory in which the current directory number is set to the directory number is formed. The processes are finished.

Figure 8:
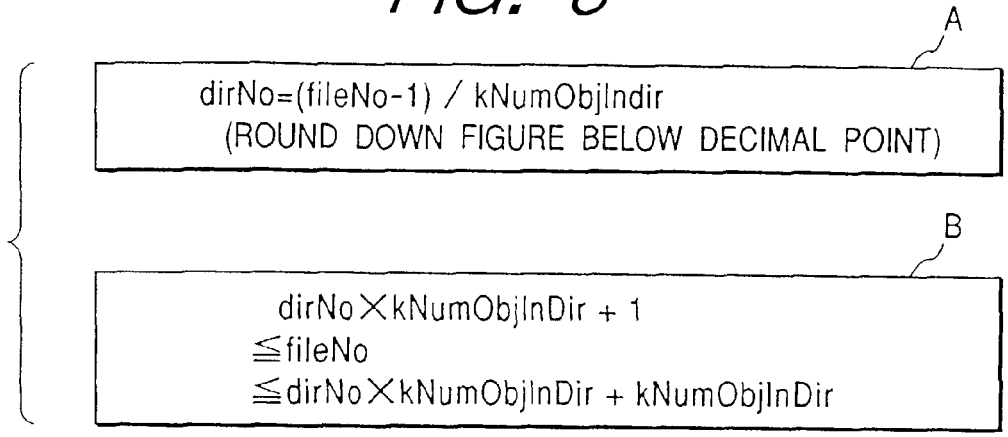
FIG. 8 is a diagram showing the relation between numerical values included in a file example and numerical values included in a directory name in which they have been stored.
Figure 9:
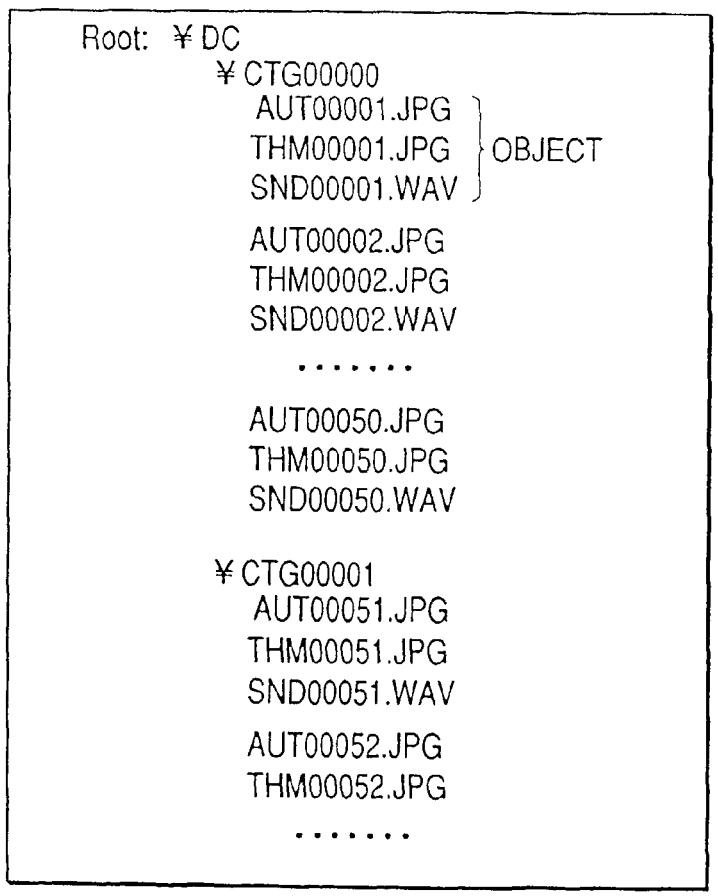
FIG. 9 is a diagram showing a structure of files which are formed by the electronic camera in the embodiment.

The current directory number is obtained by substituting the current file number for the file number of the equation (A) in FIG. 8. Even in the following description, the current directory number indicates the directory number which is obtained by substituting the current file number at that time point for the equation (A) in FIG. 8.

In step S5, when one or more CTG directories exist in the DC directory, the processing routine advances to step S6.

In step S6, a directory entry starting from "CTG" is searched from the directory entries in the DC directory. The directory entry having the maximum directory number is obtained from them and such a value is stored into a maximum directory number dirNoFound as a variable.

In step S7, a check is made to see if something having the name corresponding to the maximum directory number dirNoFound obtained in step S6 is a file or a directory. In case of the directory, step S12 follows. In case of the file, step S8 follows and the value of the maximum directory number dirNoFound is increased by 1. Subsequently, a check is made in step S9 to see if the resultant value exceeds the upper limit directory number.

The upper limit directory number is obtained by substituting 99999 as an upper limit among possible values as a file number for the file number fileNo in the equation (A) in FIG. 8. If the maximum directory number dirNoFound is larger than this value, an error message is displayed in step S18 and the processes are finished. If it is not larger, the processing routine advances to step S10.

In step S10, a check is made to see if the CTG directory in which the maximum directory number dirNoFound obtained in step S8 is set to the directory number exists. When it does not exist, a CTG directory is formed in step S11.

In step S12, a check is made to see if the current directory number currDirNo is larger than the maximum directory number dirNoFound by comparing them. When it is larger, a CTG directory in which the current directory number is set to the directory number is formed in step S23. When it is smaller, the processing routine advances to step S13.

In step S13, the contents in the directory in which the maximum directory number dirNoFound is equal to the directory number are examined. A file having the maximum file number among the files included in the directory is obtained and stored into the maximum file number fileNoFound. In this instance, when the file does not exist in the directory, the minimum value among the possible values which can be set into the file number fileNo when the directory number dirNoFound in an equation (B) in FIG. 8 is substituted is set.

In step S14, the maximum file number obtained in step S13 is compared with the current file number. When the current file number is larger, step S15 follows. If NO, the processing routine advances to step S16.

In step S15, the current file number is changed to the value obtained by adding 1 to the maximum file number. The current directory number is updated by the equation (A) in FIG. 8 on the basis of the resultant value.

In step S16, a check is made to see if a CTG directory in which the current directory number is set to the directory number exists. When it exists, the processes are finished. When it does not exist, a CTG directory corresponding to the current directory number is formed in step S21 and the processing routine is finished.

By the above processes, the setting of the CTG directory to store the data which is generated by the camera when the card is inserted into the system and the setting of the current file number included in the file name to be subsequently formed are executed.

When the formatted card or the EraseAll card is inserted, if the current/file number is larger than the file number threshold value, the current file number is initialized to 1. In this case, since no object ought to certainly exist in the memory card, a situation such that the new data is stored by the same file name as the file which has originally existed and the inherent data which has originally existed is lost is prevented.

Figure 5:
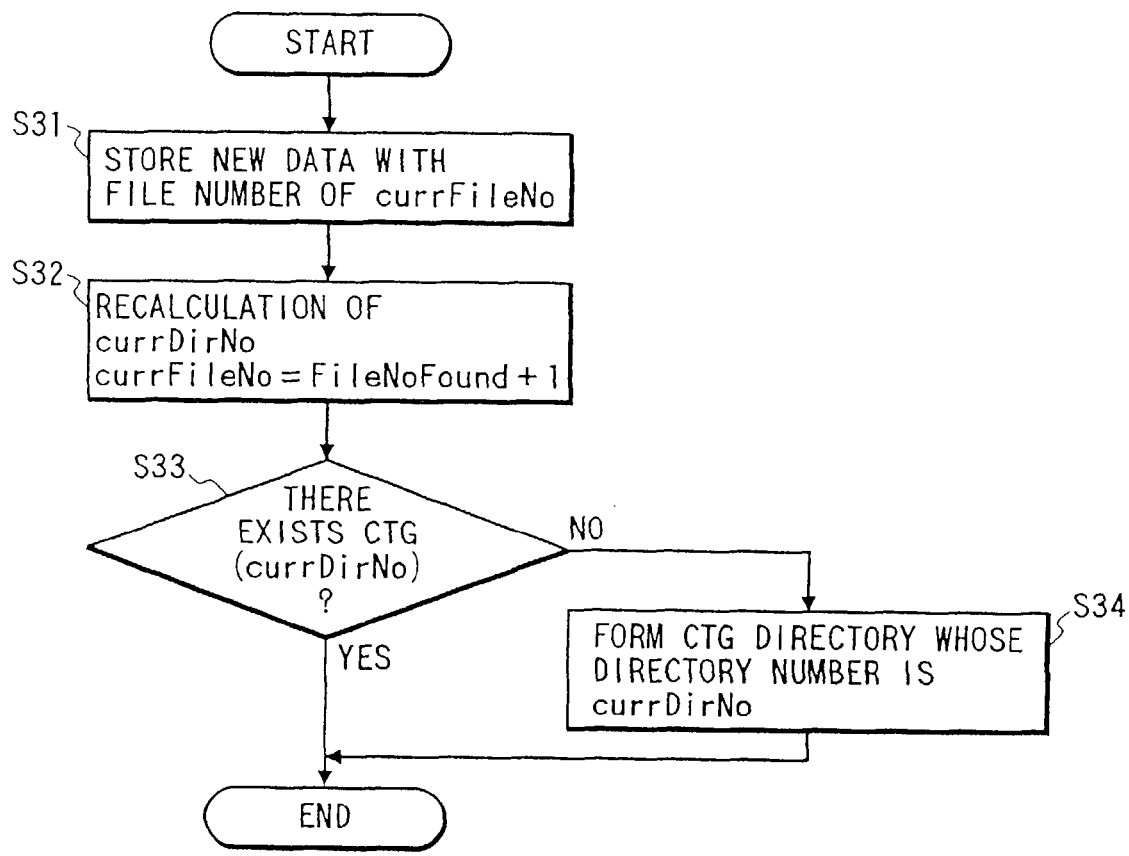
FIG. 5 is a flowchart showing the operation when data is stored into the memory card in the electronic camera.

A case of storing the data generated by the camera 7 into the card will now be described with reference to a flowchart shown in FIG. 5.

First, in step S31, data to be recorded is stored as a file into the storage device. The file number at this time is a current file number and the directory number of the CTG directory in which the file is stored is obtained from the current file number by the equation (A) in FIG. 8.

In step S32, the current file number is increased by 1 and the current directory number is obtained on the basis of the resultant value.

In step S33, a check is made to see if the directory corresponding to the current directory number exists in the DC directory. When it has already existed, the processing routine is finished. When it does not exist, in step S34, a directory in which the directory number is set to the current directory number is formed and the processes are finished.

The above exception process will now be described. In the system, by storing the current file number into the camera 7, the file name which is generated by one camera is made unique. As mentioned above, however, since the file name is made up of the file number comprising alphanumerical characters of three characters and the decimal number of five digits and the extension of three characters like "AUT10100.JPG", the last (maximum) values which can be used as a file number are equal to 99999.

Hitherto, when the current file number exceeds such a value, the camera displays an error and does not operate or simply initializes the file number to 0 and newly forms a file irrespective of a fact that the file of the file number 0 exists. In the embodiment, therefore, the following processes are executed as exception processes so as to prevent the camera from entering such a situation.

(1) First, in the case where the current file number stored in the camera 7 is equal to or larger than 99999 as a file number threshold value and no CTG directory exists in the card, the value of the current file number is initialized to 1.

(2) When the card having the file whose file number is equal to or larger than 99900 is found in the host application, all of the files are transferred from the card to the computer and, after that, a message to promote the user to delete all of the CTG directories by a card formatting process or the like is displayed.

The above first exception process (1) is executed when the card is inserted or when the power source of the electronic camera is turned on with the card inserted. This process is executed when the current file number exceeds the preset file number threshold value (99900) in the camera. If the CTG directory does not exist in the card, the current file number is initialized in the camera sole body. This process corresponds to the process in step S20 in FIG. 4B.

The second exception process (2) is executed when the computer intends to read the card. When the file in which a value that is equal to or larger than the file number threshold value set in the camera 7 is set to the file number exists, a warning message is displayed, thereby promoting the user to delete all of the CTG directories in the card. After that, when the card is again inserted into the camera or the power source is again turned on, the exception process (1) in step S20 in the flowchart described in FIG. 4B is executed and the current file number is reset to 1.

By the above operation, even if the file number is overlapped and formed, a situation that the data is lost by overwriting the file can be avoided.

The operation of the above exception process will now be described with reference to a flowchart.

Figure 4B:
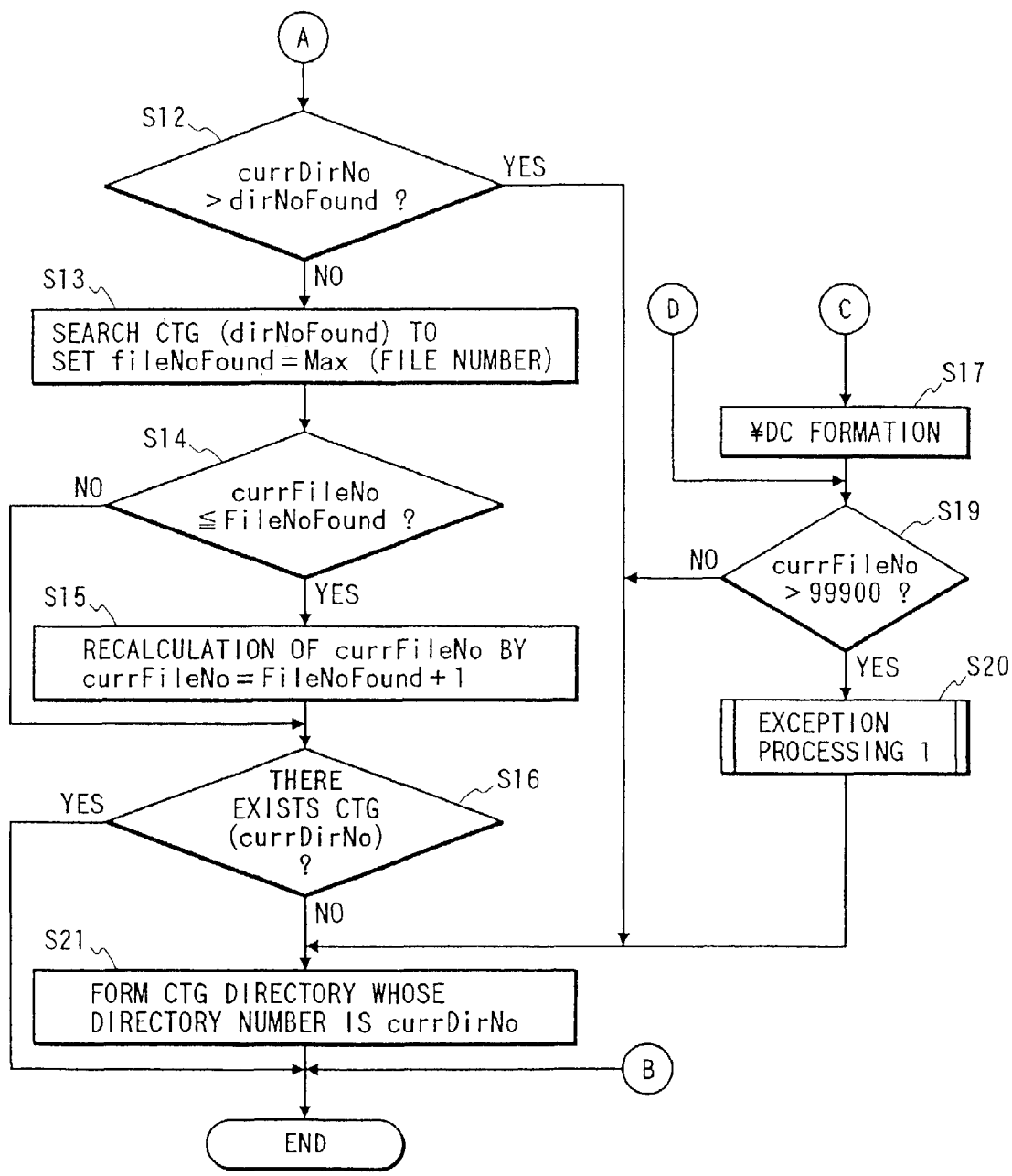
Figure 6:
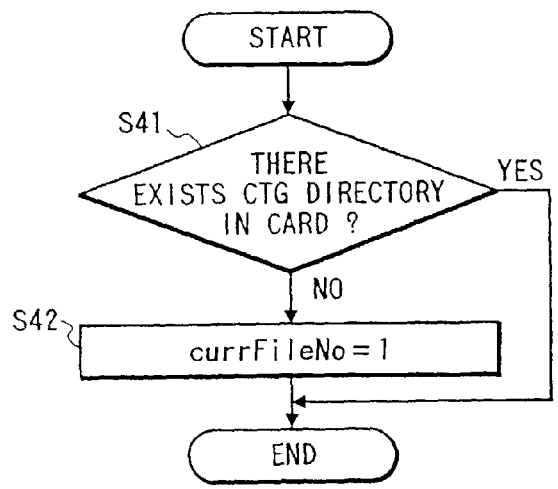
FIG. 6 is a flowchart showing the operation of an exception process when the memory card is inserted into the electronic camera.

FIG. 6 shows the operation of the first exception process (1) which is executed by the electronic camera 7 and corresponds to the process in step S20 in FIG. 4B.

First, the card inserted in the camera 7 is examined in step S41 to see if the CTG directory exists. If it does not exist, the current file number is reset to 1 in step S42.

Figure 7:
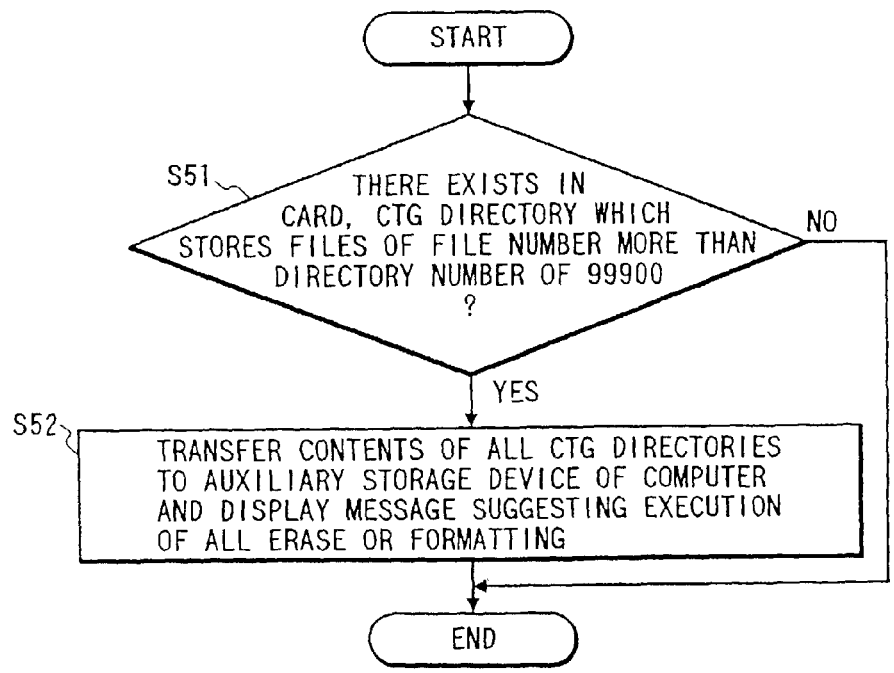
FIG. 7 is a flowchart showing the operation of an exception process in a host application of the electronic camera.

FIG. 7 shows the operation of the second exception process (2) which is executed when the camera 7 is connected to the computer. This process is executed by the host application.

First in step S51, a check is made to see if a CTG directory storing the file whose file number is equal to or larger than the file number threshold value exists. The file number threshold value is obtained from the camera 7. The directory number of the CTG directory to be examined here is obtained by substituting the file number threshold value for the file number in the equation (A) in FIG. 8. When it does not exist, the exception process (2) is finished. When it exists, the processing routine advances to step S52.

Step S52 is a process which is executed when the current file number exceeds the file number threshold value. In this case, a warning message and a message showing a method of taking a countermeasure are displayed to the user.

By the above two exception processes, by setting the file number threshold value to a value smaller than the maximum value among the possible values as a file number so as to have an allowance, if the file having the file number exceeding the file number threshold value exists, the warning message and the method of taking the countermeasure are shown by the host application. Since the file number threshold value is smaller than the possible values of the file number, even in a situation such that the file number has to exceed the file number threshold value, the camera 7 can be used for a little while (until the file number is equal to the maximum value among the possible values) without any inconvenience.

In the system of the embodiment as mentioned above, by holding the numerical values into the nonvolatile counter to store the numerical values which are included into the name of the file that is formed by the electronic camera 7, the file name which is generated by one camera 7 becomes unique in its lifetime. When the numerical values are circulated once and are initialized, even in the case where the value of the counter is unavoidably initialized and the same file name has to be formed, a data loss which is caused by overwriting and storing into the file which originally has existed by the same name can be prevented.

Figure 4C:
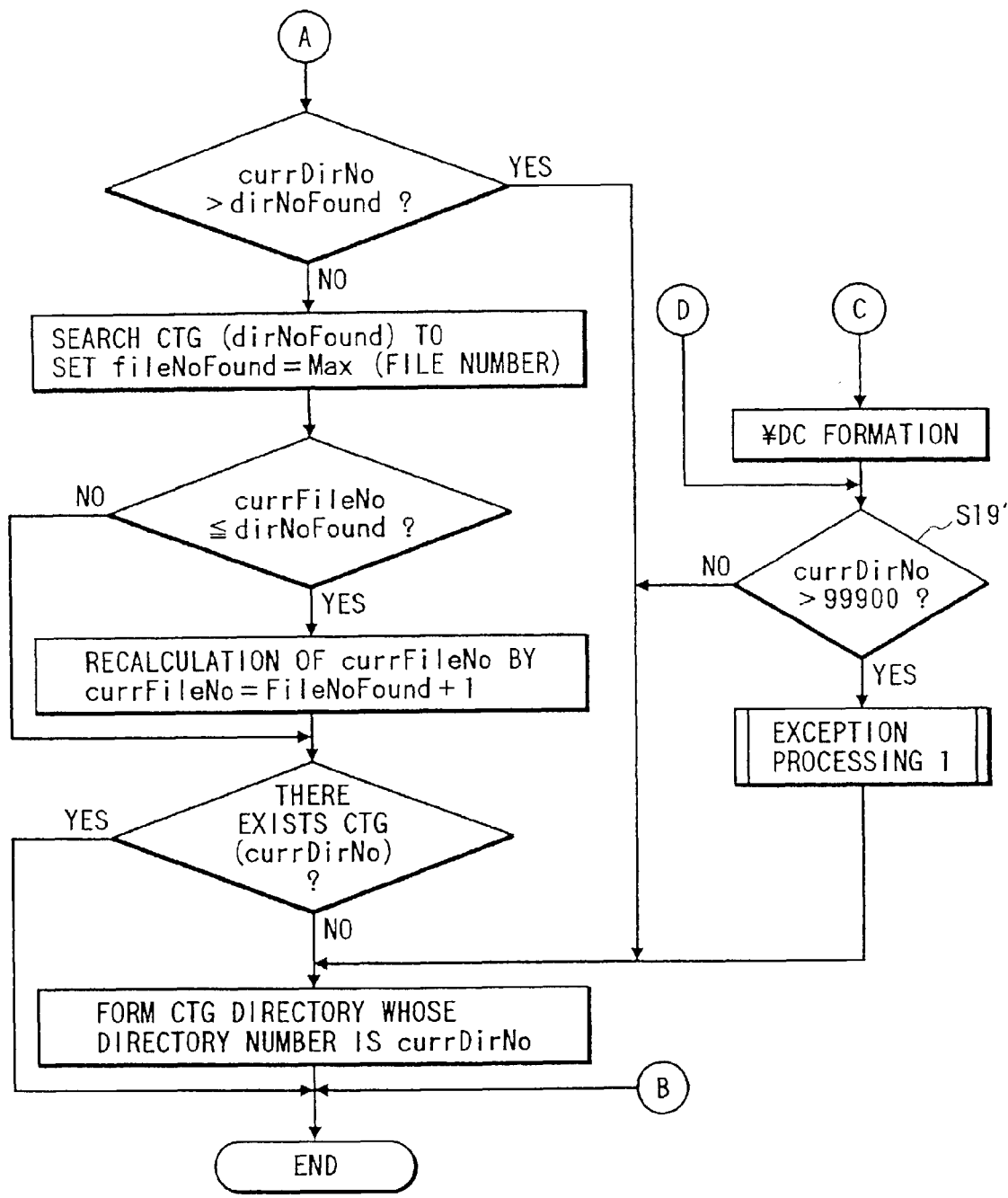
Figure 4D:
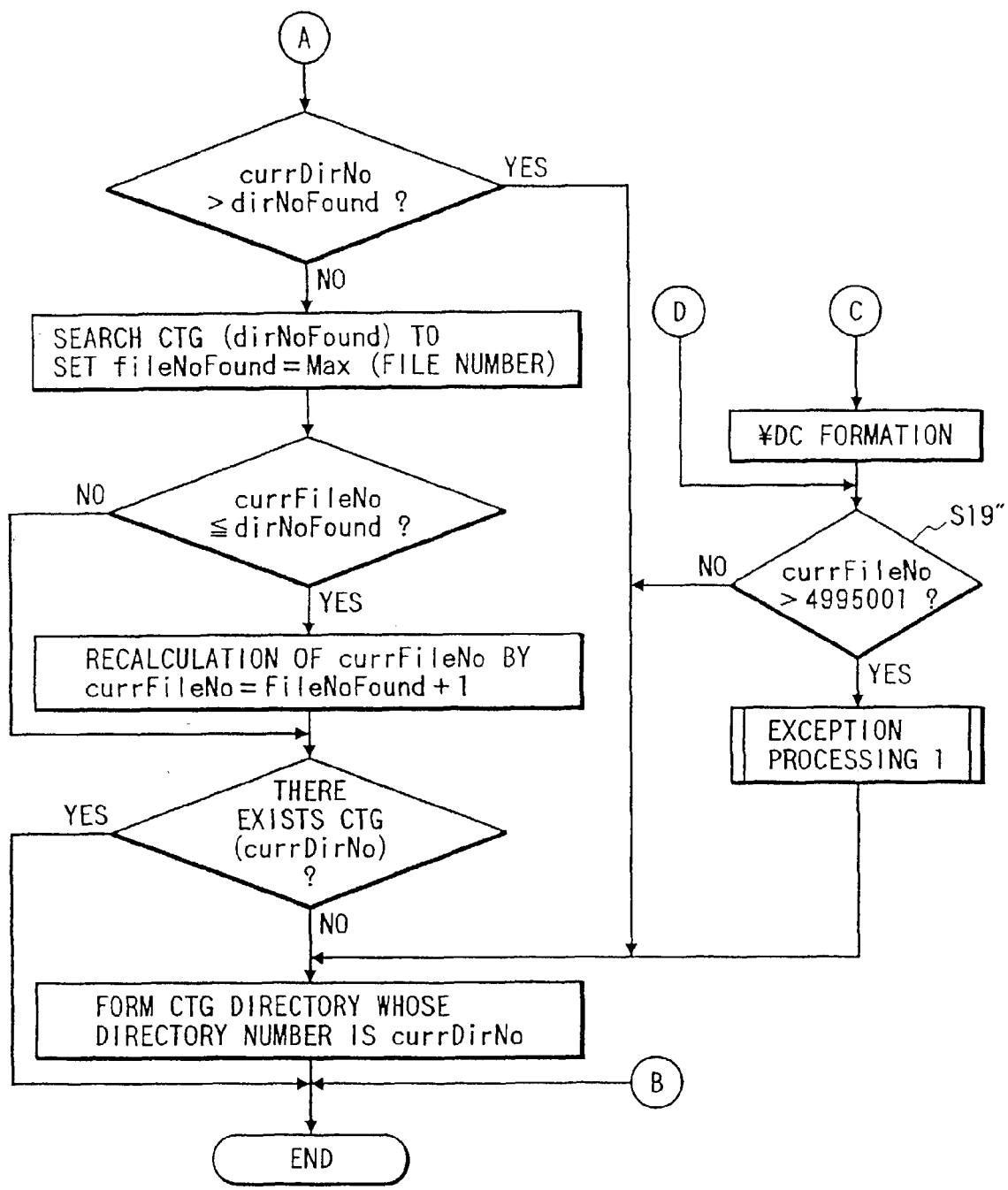

Although, in the above-described embodiment, a warning is given when the file number exceeds the upper limit of the file number, the present invention is not limited to this embodiment. It may be also possible to monitor whether the directory number exceeds an upper limit value thereof. As an example of this case, the step S19 shown in FIG. 4B may be changed to a step S19' shown in FIG. 4C to monitor whether the current directory number exceeds 99900 or not. In this connection, the directory threshold value 99900 may be stored in a nonvolatile memory of the camera. Alternately, it may be possible that the value 4995001 obtained from the first expression of the equation (B) in FIG. 8 with substitution of 99900 of the directory number, is stored in the nonvolatile memory of the camera as the file number threshold value and then substituted into the equation (A) in FIG. 8 to calculate the directory threshold value. In the latter case, as shown in a step S19" of FIG. 4D, the current file number, of course, can be compared directly with the file number threshold value. In addition, if the file number exceeds a number of five figures, the file name may be generated based on lower file figures of that file number. For example, a file whose file number is 110010, is AUT10010.JPG, THM10010.JPG, SDN10010.WAV, and its directory is ¥CTG02200.

According to the invention as described above, in the system such that the file names are sequentially formed by, for instance, including the numerical values in the ascending or descending order into the file names, by preparing the counter to hold the numerical values to be included in the file names, even if the power source of the image pickup apparatus is turned on/off or the recording medium is exchanged, so long as the image data is recorded by the same image pickup apparatus, the peculiar file name which is not overlapped can be formed for the recording image data and a situation such that a plurality of files of the same name exist can be prevented.

By displaying a warning message and a method of taking a countermeasure as an exception process when the value of the counter lies within a certain range, even in the case where the numerical values are circulated once and the same file name is formed, a situation such that the file is overwritten and the data is deleted can be prevented.

Further, by classifying the files into appropriate directories and storing the classified files, time required by the file system to search the existing files to determine a new file name can be shortened. For example, when the kNumObjInDir described in the embodiment is predetermined as 50, the number of files stored in one directory is 150 at the maximum. Specifically, when a 1000-th image is recorded by searching the file names of the other recorded images to detect whether the same file name exists or not, only directory entry for 20 directories and 147 files at the maximum has to be searched compared with when 1000 images are stored in one directory. Therefore, time required to determine the new file name can be reduced to less than one-fifth. This search can be executed by a CPU of 80C86 8 MHz within one second and thus is of enough practical use. In addition, by setting the kNumObjInDir as 50, relationship between the directory number and the file number can be easily calculated by a person and thus easily recognized by him.

Many widely different embodiments of the present invention may be constructed without departing from the spirit and scope of the present invention. It should be understood that the present invention is not limited to the specific embodiments described in the specification, except as defined in the appended claims.

What is claimed is:

1. A file management system for managing image data as an image data file stored in a directory, wherein said image data is generated by an image pickup apparatus, comprising:
   a file generator that generates an additional data file related to the image data file but other than the image data file so that the additional data file and the image data file have a same numeral file number and a different extension in the directory; and
   a file manager that manages the additional data file and the image data file having the same numeral file number as the additional data file, as one object in the directory on the basis of the same numeral file number so that the file manager performs directory management operations on the object itself as one data unit,
   wherein said file manager is arranged to delete together the additional data file and image data file having the same file number as the additional data file, as one object in such a manner that the file manager deletes none of the additional data file and the image data file having the same number as the additional data file, in a case where at least one of the additional data file and the image data file having the same number as the additional data file has a protection attribute.

2. A system according to claim 1, wherein the object is managed so that deletion of the object from an application in one of said image pickup apparatus and a computer is inhibited in a case where either one of the image file and the additional data file included in the object has a protection attribute, even if both of the image file and the additional data file do not have a protection attribute.

3. A file management method of managing image data as an image data file stored in a directory, wherein said image data is generated by an image pickup apparatus, comprising:

a file generation step of generating an additional data file related to the image data file but other than the image data file so that the additional data file and the image data file are generated in said image pickup apparatus and have a same numeral file number and a different extension in the directory; and a file managing step of managing with a file manager, the additional data file and the image data file having the same numeral file number as the additional data file, as one object in the directory on the basis of the same numeral file number so that the file manager performs directory management operations on the object itself as one data unit, wherein said file managing step is arranged to delete together the additional data file and image data file having the same file number as the additional data file, as one object in such a manner that the file managing step deletes none of the additional data file and the image data file having the same number as the additional data file, in a case where at least one of the additional data file and the image data file having the same number as the additional data file has a protection attribute.

4. A method according to claim 3, wherein the object is managed so that deletion of the object from an application in one of said image pickup apparatus and a computer is inhibited in a case where either one of the image file and the additional data file included in the object has a protection attribute, even if both of the image file and the additional data file do not have a protection attribute.

5. A non-transitory computer-readable recording medium storing a computer-executable program, said computer-executable program being executable by a computer so as to control the computer to execute a file management process of managing image data as an image data file stored in a directory, wherein said image data is generated by an image pickup apparatus, said computer-executable program including program code comprising:

code for executing a file generating process of generating an additional data file related to the image data file but other than the image data file so that the additional data file and the image data file are generated in said image pickup apparatus and have a same numeral file number and a different extension in the directory; and code for executing a file managing process of managing, with a file manager, the additional data file and the image data file having the same numeral file number as the additional data file, as one object in the directory on the basis of the same numeral file number so that the file manager performs directory management operations on the object itself as one data unit, wherein said file managing process is arranged to delete together the additional data file and image data file having the same file number as the additional data file, as one object in such a manner that the file management process deletes none of the additional data file and the image data file having the same number as the additional data file, in a case where at least one of the additional data file and the image data file having the same number as the additional data file has a protection attribute.

6. A medium according to claim 5, wherein said file management process includes a process of managing the object so that deletion of the object from an application in one of said image pickup apparatus and a computer is inhibited in a case where either one of the image file and the additional data file included in the object has a protection attribute, even if both of the image file and the additional data file do not have a protection attribute.

7. An image pickup apparatus for use with a file management system for managing image data as an image data file stored in a directory, wherein said image data is generated by said image pickup apparatus, said image pickup apparatus comprising:

a file generator that generates an additional data file related to the image data file but other than the image data file so that the additional data file and the image data file are generated in said image pickup apparatus and have a same numeral file number and a different extension in the directory; and a file manager that manages the additional data file and the image data file having the same numeral file number as the additional data file, as one object in the directory on the basis of the same numeral file number so that the file manager performs directory management operations on the object itself as one data unit, wherein said file manager is arranged to delete together the additional data file and image data file having the same file number as the additional data file, as one object in such a manner that the file manager deletes none of the additional data file and the image data file having the same number as the additional data file, in a case where at least one of the additional data file and the image data file having the same number as the additional data file has a protection attribute.

8. An apparatus according to claim 7, wherein the object is managed so that deletion of the object from an application in one of said image pickup apparatus and a computer is inhibited where either one of the image file and the additional data file included in the object has a protection attribute, even if both of the image file and the additional data file do not have a protection attribute.

* * * * *